June 3, 1952  H. JEANNERET  2,599,109

WINDING INDICATOR

Filed July 31, 1951

INVENTOR
HERBERT JEANNERET
By E.? Freeman
ATTORNEY.

Patented June 3, 1952

2,599,109

UNITED STATES PATENT OFFICE 2,599,109

WINDING INDICATOR

Herbert Jeanneret, Geneva, Switzerland

Application July 31, 1951, Serial No. 239,443
In Switzerland August 11, 1950

5 Claims. (Cl. 58—85)

My invention has for its object a time-piece incorporating an automatic winding up means and an indicator of spring-expansion.

According to the invention, the gear controlling the indicator of spring-expansion includes a wheel carried by a swinging lever lying in the path of a member controlling the indicator, the arrangement being such that when the spring is completely wound up, said member abuts against the swinging lever and shifts it in a manner such as to disconnect said movable wheel, which leads to a stopping of the spring-expansion indicator.

I have illustrated by way of example in accompanying drawings a preferred embodiment of my invention; only the parts required for the understanding of the invention have been illustrated in said drawings, wherein.

Figure 1:
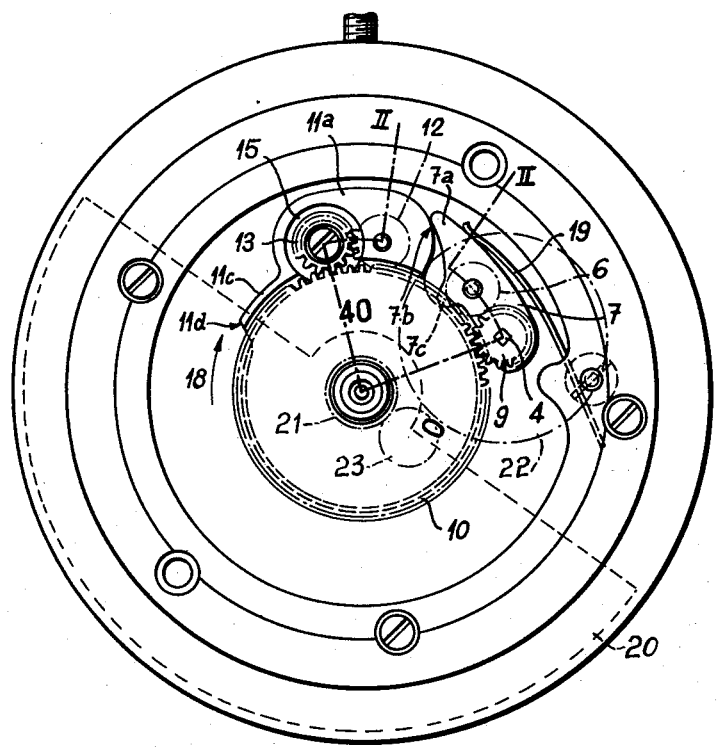
Fig. 1 is a plan view of a time-piece provided with automatic winding up means, as seen from the dial side.
Figure 2:
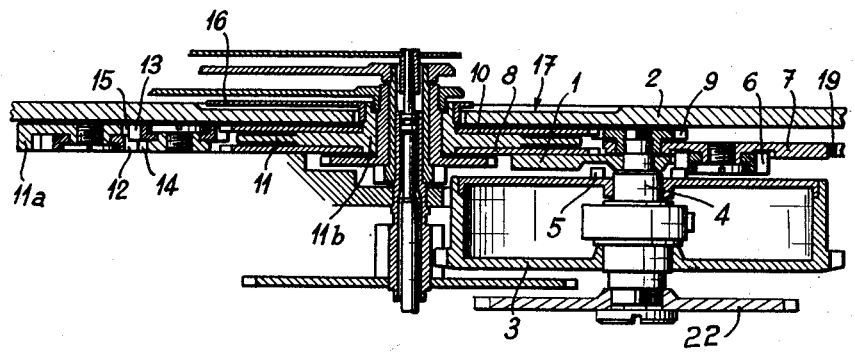
Fig. 2 is a cross-section through line II—II of Fig. 1.

In said figures, the plate of the time-piece is shown at 1, the dial at 2, the barrel at 3 and the barrel spindle at 4. This barrel spindle 4 is driven by an automatic winding up means comprising an oscillatable weight 20 to which is secured a pinion 21 which drives a wheel 22, carried by the spindle 4, through an overrunning coupling 23 the detail of which is not shown on the drawing. The cover of the barrel carries an upstanding series of teeth 5 coaxial therewith and meshing with the lower end of an elongated transmission gearwheel 6 rotatably carried by a swinging lever 7 which latter is adapted to rock round the barrel spindle 4. Said transmission wheel 6 passes through an opening in the plate 1 and meshes through its upper end with a wheel 8 rotatably carried by a spindle coaxial with the clockwork. The barrel spindle 4 is rigid with a wheel 9 meshing with a wheel 10 coaxial with the wheel 8 and carried therewith by the sleeve 11b as will be disclosed hereinafter. Between the wheels 8 and 10 is pivotally secured a carrier member 11 provided with a lug 11a carrying two transmission gearwheels 12 and 13 meshing on one hand with each other and on the other hand with the wheel 8 or 10 corresponding thereto. The transmission wheel 12 engages a peripheral recess 14 in the carrier member 11 provided on the lower surface of the latter and meshes with the wheel 8 while the transmission wheel 13 is fitted in a similar peripheral groove 15 provided along the edge of the upper surface of the carrier member 11 and it meshes with the wheel 10.

The peripheral grooves 14 and 15 provided in the opposite surfaces of the carrier 11 open partly into one another so that the transmission wheels 12 and 13 may engage one another through a fraction of their height. The carrier member 11 is rigid with a sleeve or bushing 11b on which are rotatably carried the wheels 8 and 10 and that carries a hand 16 forming the spring-expansion indicator, said hand rotating in a depression 17 provided in the central portion of the dial. During the winding up, the pinion 9 on the barrel spindle drives the wheel 10 which controls in its turn the transmission wheel 13. The latter drives the transmission wheel 12 which rolls over the wheel 8 that is normally held fast by the wheel 6 so as to shift the lug 11a and consequently the carrier 11 in the direction of the arrow (Fig. 1) together with the hand 16 that indicates the stage of the winding. When the winding up is at an end, the spring expands and provides for a rotation of the barrel. The teeth 5 on the latter drive the transmission member 6 which in its turn drives the wheel 8 meshing with the transmission wheel 12. The latter drives the transmission wheel 13 which rolls over the wheel 10 and provides for a rotation of the carrier 11 in a direction opposed to the last mentioned rotation.

The rocking lever 7 carrying the transmission gear 6 is provided with a nose 7a extending into the path followed by the lug 11a on the carrier 11. At the moment at which the spring in the barrel is completely wound up, the lug 11a engages a slope 7b provided on the nose 7a of the swinging lever 7 and shifts the latter rearwardly in antagonism to the return spring 19, which leads to a disconnection of the transmission gear 6 which moves away from the wheel 8. The latter is thus released and revolves in a direction opposed to the wheel 10 while the automatic winding up means continues operating; the carrier 11 is no longer shifted. As soon as the winding up is at an end and the barrel spring begins expanding, the swinging lever 7 resumes its operative position under the action of the spring 19; the transmission gear 6 returns into engagement with the wheel 8 and the carrier 11 is again urged into movement.

The swinging lever 7 is provided with a second nose, shown at 7c, extending into the path followed by an extension 11c of the carrier 11. At the moment at which the spring in the barrel is completely expanded, that is to say at the moment at which the swinging lever achieves its run in the direction opposed to the arrow 18, the slope 11d of the extension 11c engages the nose 7c of the swinging lever 7 for shifting this latter in its disconnecting position. Thus, if for an accidental reason the spring-expansion indicator is out of order so that the carrier reaches the end of its run before the spring in the barrel is completely expanded, the watch does not stop but the disconnection takes place.

As a modification, the hand 16 could be replaced by a rotatable disc secured to the sleeve 11b, under the dial 2. This disc should carry indications which should appear through a window provided in the dial 2.

What I claim is:

1. In a time piece, the combination of automatic winding up means, a barrel, a spring contained therein controlled by the winding up means, a spring-expansion indicator, a member operating same, a swinging lever lying in the path of said member, a gearing operating said indicator and including a wheel rotatably mounted on said swinging lever, the arrangement being such that when the spring is completely wound up, said member abuts against said swinging lever and shifts it in a manner such as to disconnect said wheel, which leads to a stopping of the spring expansion indicator.

2. In a time piece, the combination of automatic winding up means, a barrel, a spring contained therein controlled by the winding up means, a spring-expansion indicator, a transmission including two normally interengaging wheels, a control member for said indicator controlled by said transmission, a swinging lever member on which one of the last mentioned wheels is rotatably carried and means carried by the control member adapted to abut against said swinging lever when the spring is completely wound, to urge said swinging lever into an inoperative position by which the two wheels are disconnected, the disconnection of said wheels providing a stoppage of the control member for the spring-expansion indicator in the position assumed by it for the completely wound conditions of the wheel.

3. In a time piece, the combination of automatic winding up means, a barrel, a spring contained therein controlled by the winding up means, a spring-expansion indicator, a member controlling same, a transmission including a wheel controlling the indicator control member, a swinging lever provided with a nose and to which said wheel is rotatably secured, a projection rigid with the indicator controlling member, a spring urging the nose of said swinging lever into contact with the projection on the indicator controlling member, the projection of the controlling member being adapted to urge the nose of the swinging lever in antagonism to the last mentioned spring away from the position for which the wheel is operative, to disengage said wheel from the transmission and thereby disconnect the movement of the spring-expansion indicator.

4. In a time piece, the combination of automatic winding up means, a barrel, a spring contained therein controlled by the winding up means, a spring-expansion indicator, a transmission including two normally interengaging wheels, a rotary carrier for said indicator controlled by said transmission, a rocking carrier member on which one of the last mentioned wheels is rotatably carried and means carried by the rotary carrier adapted to abut against the rocking member when the spring is completely wound, to urge said rocking member into an inoperative position for which the two wheels are disconnected, the disconnection of said wheels providing a stoppage of the rotary carrier for the spring expansion indicator in the position assumed by it for the completely wound conditions of the wheel.

5. In a time piece, the combination of automatic winding up means, a barrel, a spring contained therein controlled by the winding up means, a spring-expansion indicator, a transmission including a rotatable indicator carrier, a radial extension on this member, a first wheel coaxially and rotatably carried by said indicator carrier, a pinion controlling said wheel and rotatably carried by the extension of the rotatable indicator carrier, a pinion rigid with the barrel coaxially therewith, a wheel engaging on one hand the pinion on the barrel and on the other the wheel on the indicator member, a swinging lever adapted to pivot round the axis of the barrel and rotatably carrying the last mentioned wheel, means urging said lever into engagement with the projection on the carrier, a transmission operatively connecting the barrel spring with the first pinion to provide an angular shifting of the indicator as long as the wheel on the lever meshes with the first wheel, the complete winding of the spring bringing the projection on the rotatable carrier into engagement with the swinging lever to shift the latter away from the first wheel to set the second wheel in its inoperative disconnected position, the disconnection of said wheel providing a stoppage of the indicator carrier in the position assumed by it for the completely wound conditions of the watch spring.

HERBERT JEANNERET.

No references cited.